United States Patent [19]
Thomson

[11] Patent Number: 5,711,213
[45] Date of Patent: Jan. 27, 1998

[54] NUT CRACKER

[76] Inventor: Kirk Thomson, P.O. Box 56, Cairo, Ga. 31729

[21] Appl. No.: 624,079

[22] Filed: Mar. 29, 1996

[51] Int. Cl.[6] ............................................. A23N 5/02
[52] U.S. Cl. ...................................... 99/571; 99/581
[58] Field of Search ................................ 99/571, 577, 580, 99/581, 582

[56] References Cited

U.S. PATENT DOCUMENTS

| | | | |
|---|---|---|---|
| 2,622,642 | 12/1952 | Meyer | 146/12 |
| 3,561,513 | 2/1971 | Lindsey | 99/571 |
| 3,871,275 | 3/1975 | Quantz | 99/571 |
| 4,332,827 | 6/1982 | Quantz | 426/481 |
| 4,418,617 | 12/1983 | Quantz | 99/571 |
| 4,441,414 | 4/1984 | Quantz | 99/571 |
| 4,467,710 | 8/1984 | Verma et al. | 99/571 |
| 4,805,527 | 2/1989 | Yoshihara | 99/571 |

*Primary Examiner*—Reginald L. Alexander
*Attorney, Agent, or Firm*—Peter Loffler

[57] ABSTRACT

A nut cracker is comprised of a closed loop orbiting conveyor system that lifts nuts from a hopper and individually deposits the nuts into a nut receptacle upon passing through the upper summit of the orbit path. A positioning air cylinder, actuated by a sensor conveyor system contact with a sensor switch, securely positions and stresses the nut within the receptacle against a cracking system wherein a cracking air cylinder, actuated by the cracking system, thrusts its rod outwardly striking a cracking dyes which in turn cracks the nut. The nut is then gravity deposited into a collection bin.

15 Claims, 6 Drawing Sheets

NUT CRACKER

BACKGROUND OF THE INVENTION

1. Field of the Invention

The present invention relates to a nut cracker and more specifically to an automatic nut cracker that automatically cracks nuts of any type, shape and size.

2. Background of the Prior Art

Automatic nut crackers are known in the art. U.S. Pat. No. 2,622,642 issued to Meyer, which has found a level of commercial success in the field, automatically retrieves a nut from a hopper, sizes the nut and thereafter cracks it before depositing it in a collection bin.

The Meyer device works satisfactorily, however, the nut positioning and cracking mechanism is based on a reciprocating arm that is motor powered. Such a design is comprised of many parts and is relatively complex to manufacture and maintain. This limitation results in increased manufacture and maintenance costs and results in increased downtime whenever a part fails.

U.S. Pat. Nos. 3,871,275, 4,332,827, and 4,418,617, all issued to Quantz, provide a nut cracking apparatus that rely on pneumatic means for positioning and cracking the nut. The pneumatic design is more efficient and provides an apparatus that is relatively more simple and inexpensive to manufacture and maintain. However, the Quantz devices are designed around a turret-like cracking system that has the capability to crack several hundred nuts per minute. This high capacity feature of the Quantz devices substantially increases the devices' manufacture costs thereby making the devices cost-prohibitive for small and medium size nut operations.

Therefore, there is a need in the art for a nut cracking apparatus that relies on modern methods of operation in the nut cracking cycle. The device should rely on pneumatic means for positioning and cracking the nuts The nut cracker must be of relatively simple and straightforward design and construction so that small scale nut operations can afford the device. The device must be able to crack nuts of any appropriate size.

SUMMARY OF THE INVENTION

The nut cracker of the present invention meets the aforementioned needs in the art. The nut cracker is designed so as to reduce the complexity of the device especially in the nut positioning and the nut cracking systems.

The nut cracker is comprised of a frame having a closed loop orbiting drive chain powered by a motor. A plurality of nut transport members is disposed along the outer periphery of the drive chain. The transport members have a lift fork and retrieves a single nut from a hopper during the transport member's ascension. The lift fork deposits its nut into a receptacle located on the next preceding transport member as the original nut-laden transport member passes through its upper summit path of travel. The open-ended receptacle carries the nut therein during the transport member's decent.

Once the receptacle is aligned with a positioning air cylinder, the air cylinder is actuated causing a positioning dye attached to the end of the air cylinder's rod to move the nut laterally across the receptacle, positioning and stressing the nut against a cracking dye of a cracking system. The positioning air cylinder's rod is locked into place. One of the transport members assures synchronized actuation of the positioning air cylinder. A cracking air cylinder is actuated thrusting its rod outwardly, impacting the base of the cracking dye causing the nut to crack. The cracking system assures synchronized actuation of the cracking air cylinder.

The cracked nut is then gravity released into a collection bin, the positioning air cylinder's rod is released and retracted and a new cracking cycle is initiated.

BRIEF DESCRIPTION OF THE DRAWINGS

Similar reference numerals refer to similar parts throughout the several views of the drawings.

DETAILED DESCRIPTION OF THE PREFERRED EMBODIMENT

Figure 1:
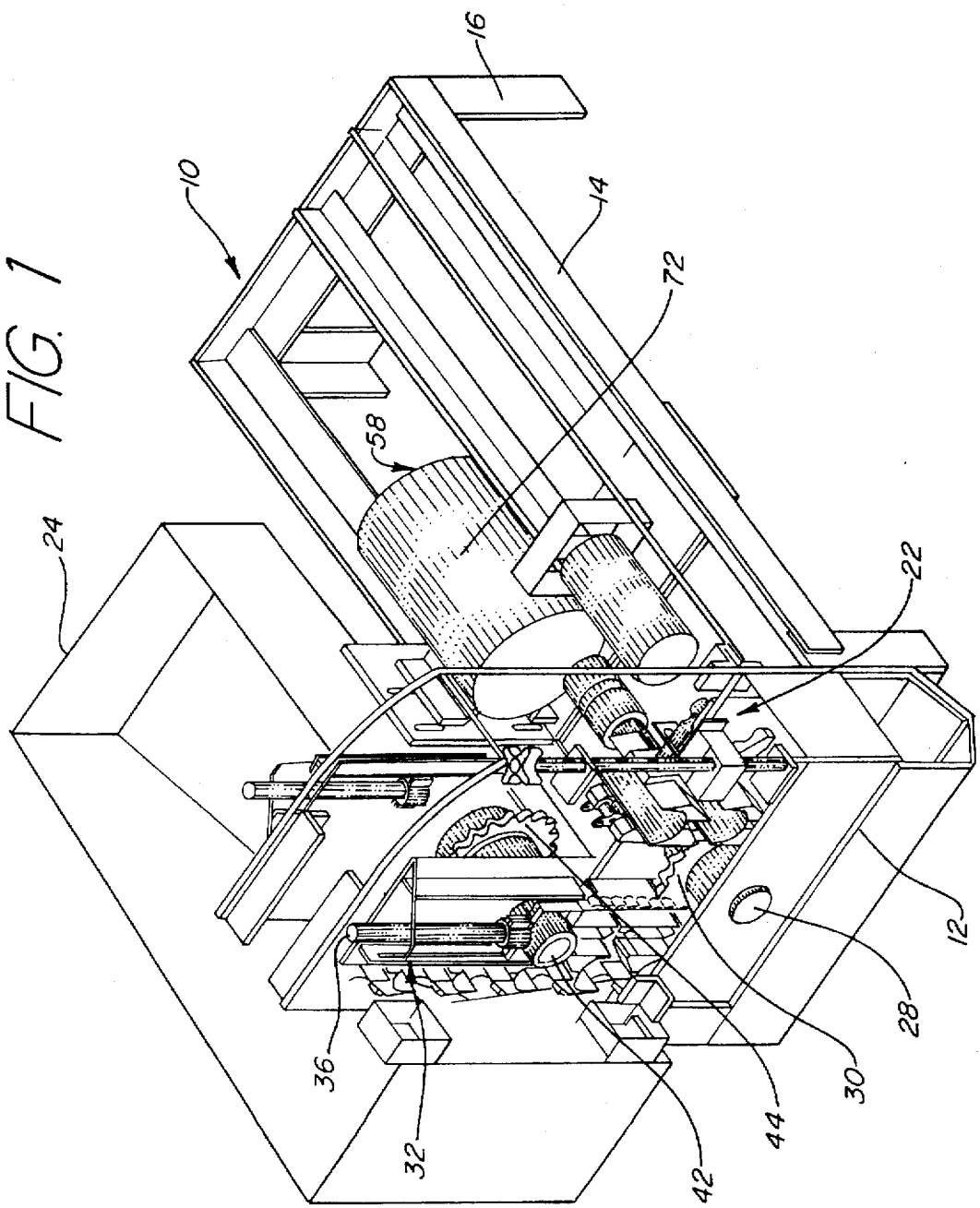
FIG. 1 is an isometric view of the nut cracker of the present invention.
Figure 2:
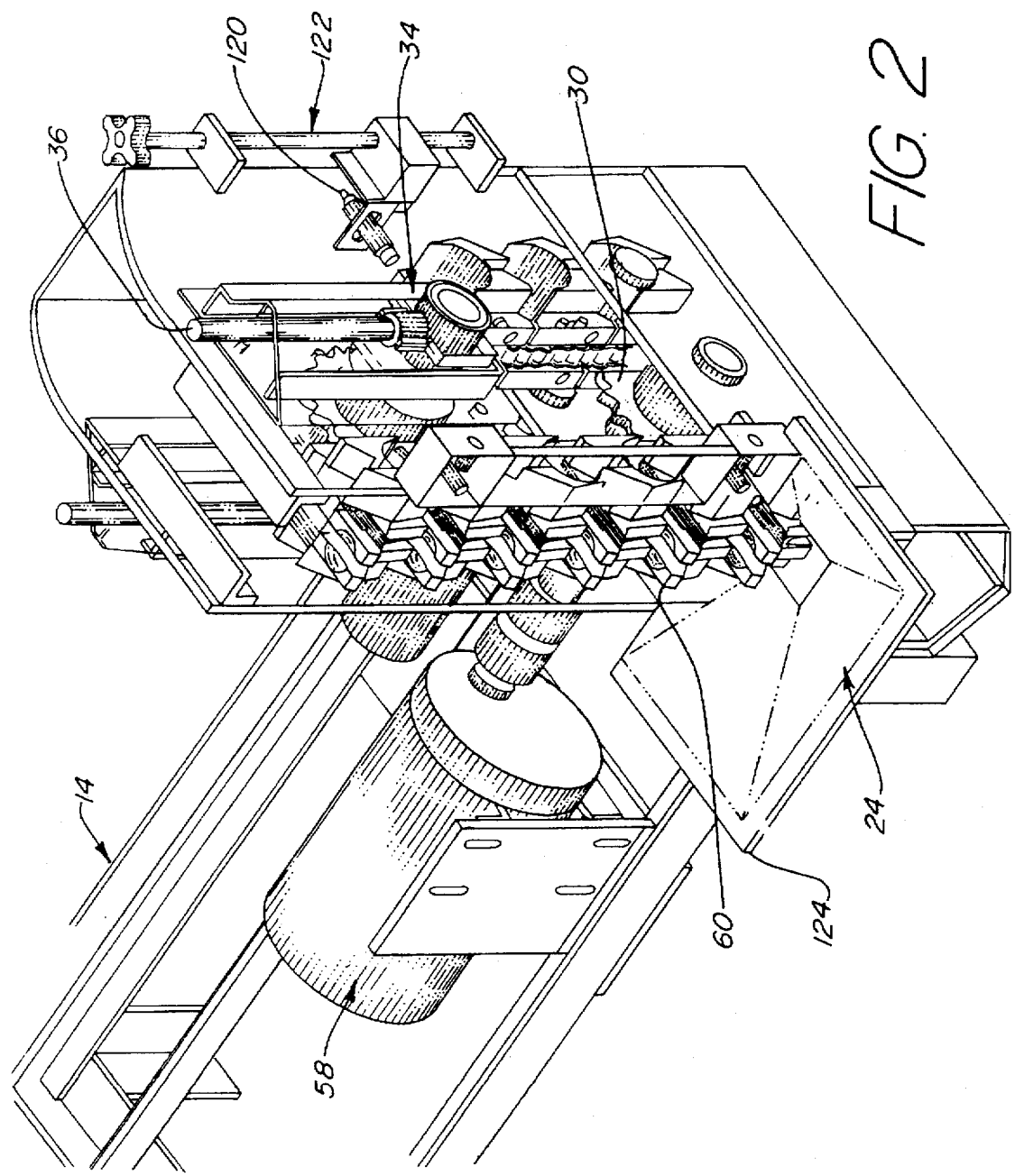
FIG. 2 is a rotated isometric view of the nut cracker of the present invention.
Figure 3:
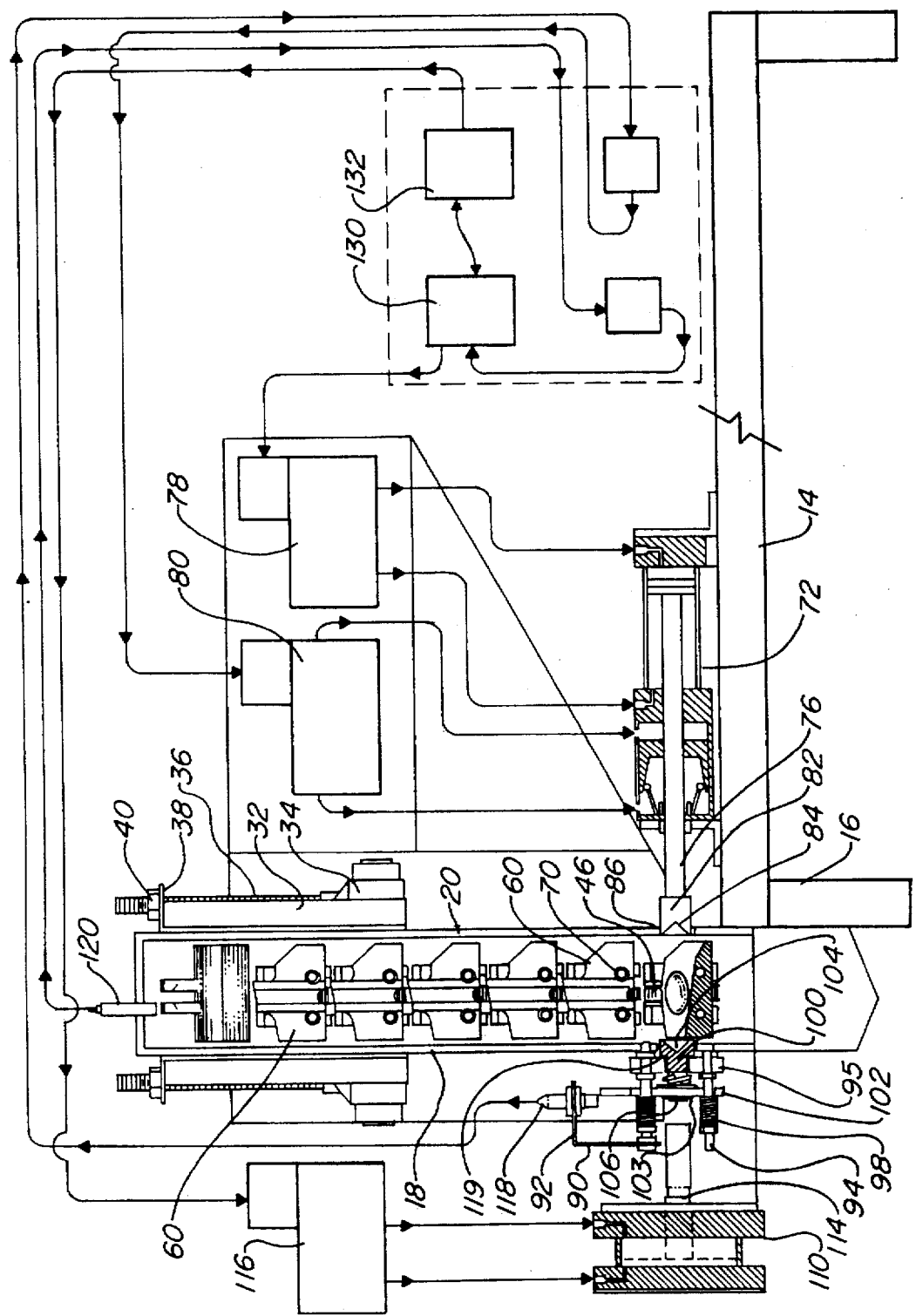
FIG. 3 is a front elevation view of the nut cracker of the present invention.
Figure 4:
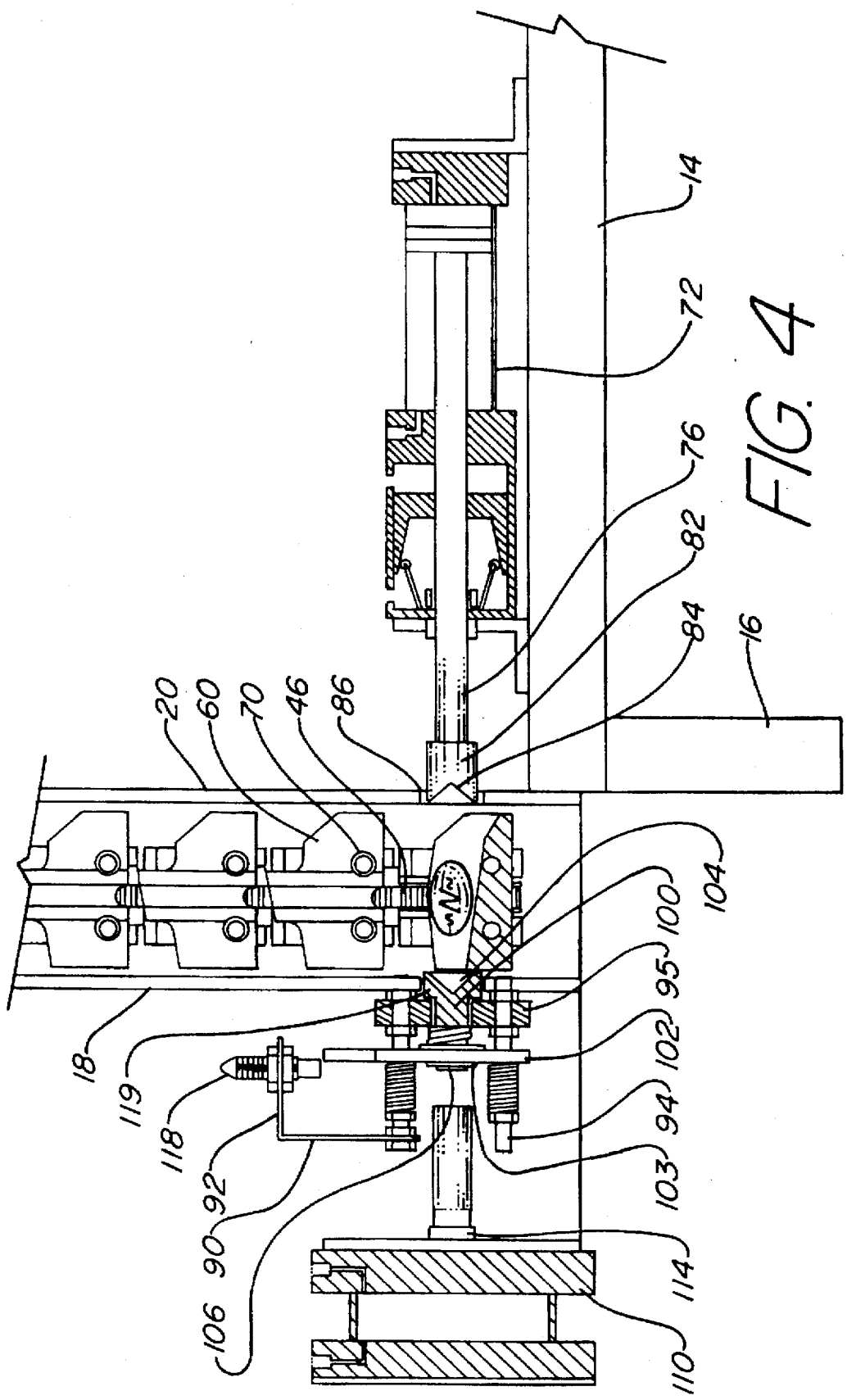
FIG. 4 is an enlarged front elevation view of the positioning and cracking systems of the nut cracker.
Figure 5:
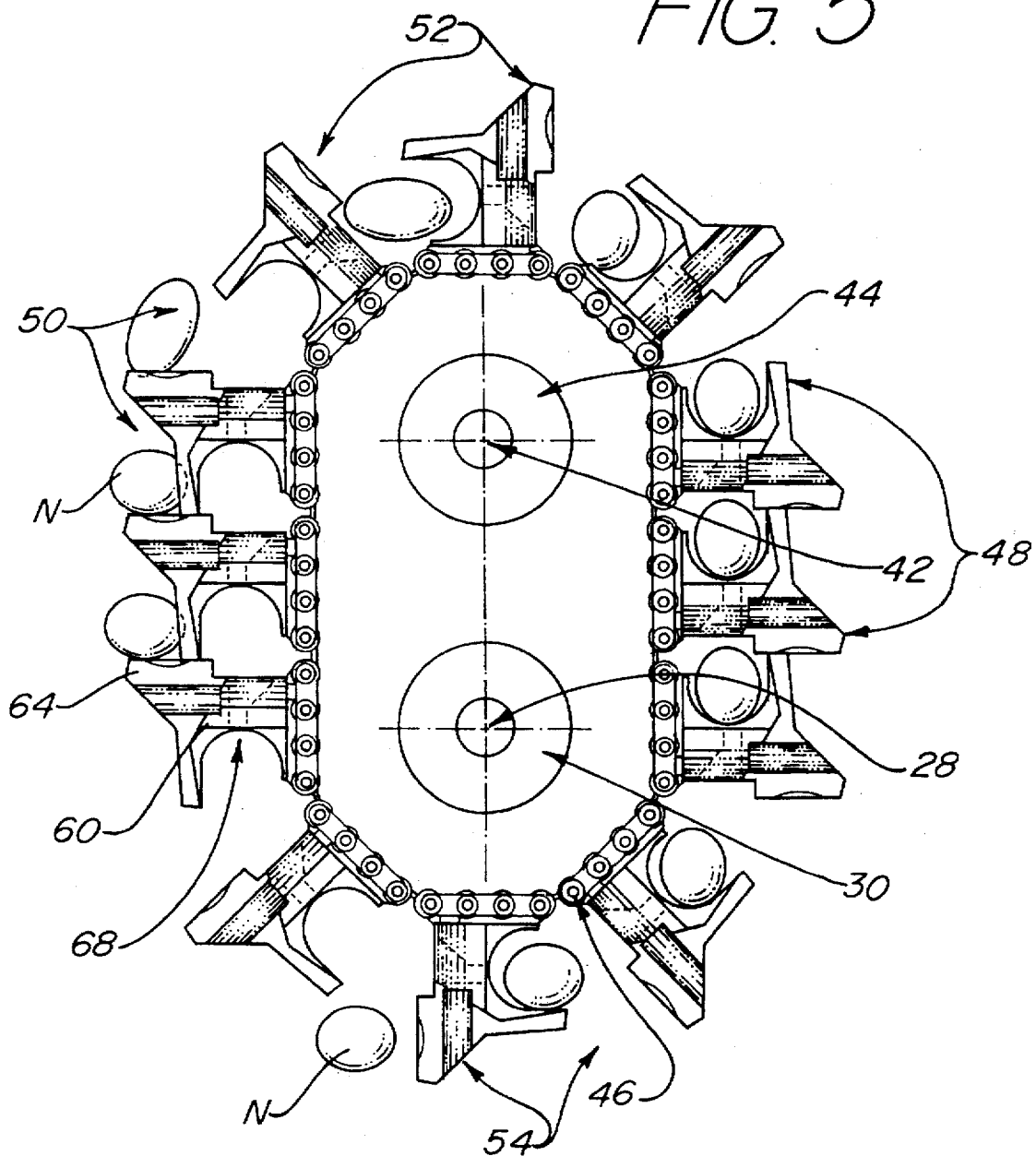
FIG. 5 is illustrates the orbit path of the conveyor system of the nut cracker.
Figure 6:
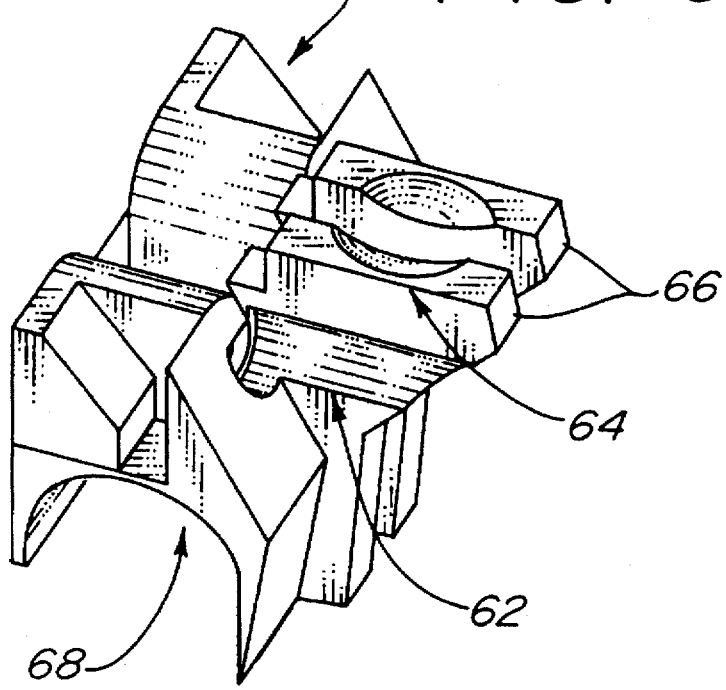
FIG. 6 is an isometric view of the transport member of the nut cracker.
Figure 7:
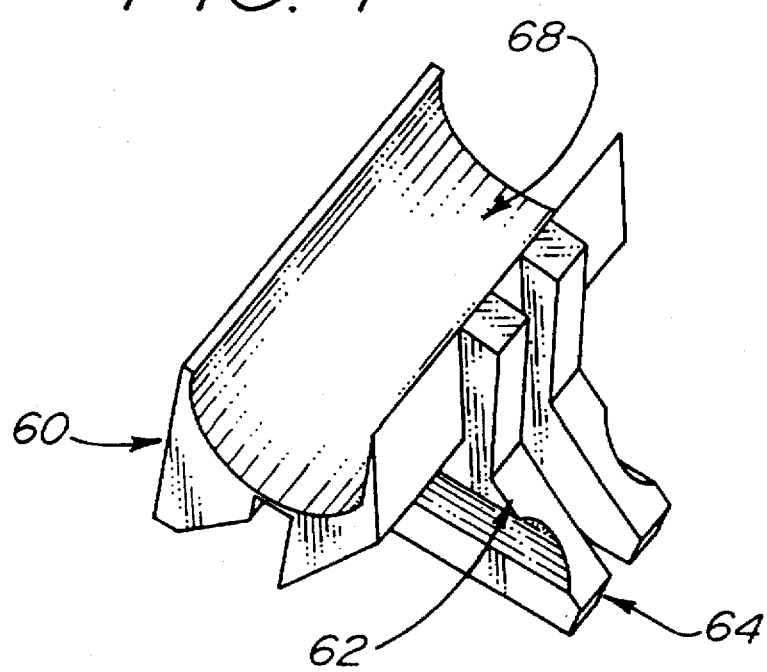
FIG. 7 is a rotated isometric view of the transport member of FIG. 6.

Referring now to the drawings, it is seen that the nut cracker of the present invention, generally denoted by reference numeral 10, is comprised of a housing unit 12 mounted on a support frame 14 having four vertical support legs 16. The housing unit 12 has a left side plate 18 and a right side plate 20 joined by a front plate 22, with the back side of the housing unit 12 being open faced. A hopper 24 is attached to the housing unit 12 such that the hopper communicates with the open face 26 of the housing unit 12.

Rotatably disposed between the left side plate 18 and the right side plate 20 is a lower shaft 28 having a lower sprocket 30 fixedly attached to the lower shaft 28. The lower sprocket 30 is rotatably carried by the lower shaft 28.

A tension means comprises a pair of takeout brackets 32 attached to the side plates 18 and 20, one takeout bracket 32 attached to each side plate 18 and 20. A takeout bearing 34 is disposed within each takeout bracket 32 and has a threaded shaft 36 extending upwardly therefrom. Each threaded shaft 36 passes through a horizontally oriented upper flange 38 of the takeout bracket 32 and has a nut 40 located thereon. Rotation of the nut 40 causes the takeout bearing 34 to rise while counter-rotation of the nut 40 causes the takeout bearing 34 to lower.

Rotatably disposed between the two takeout bearings 34 is an upper shaft 42 having an upper sprocket 44 fixedly attached to the upper shaft 42. The upper sprocket 44 is rotatably carried by the upper shaft 42. A continuous drive chain 46 is entrained about the sprockets 30 and 44. The drive chain is disposed so as to have a generally elliptical formation. The elliptical formation has a front leg 48, a back leg 50, an upper summit 52 and a lower summit 54. As seen, a plurality of block-like transport bracket pairs 56 are mounted in succession along the drive chain 46, one of the transport brackets 56 of each pair is mounted on the left of the drive chain 46 while the other of the transport brackets 56 is mounted on the right of the drive chain 46.

A drive motor 58 communicates with, and causes rotation of the lower sprocket 30 whenever the drive motor 58 is operational. This causes the drive chain 46 to continuously orbit about the lower and upper sprockets. Although the drive motor 58 is illustrated as a gear head motor, it is expressly recognized that any type of drive means can be utilized to rotate the lower sprocket, including a direct drive motor, a belt drive arrangement, etc., without departing from the spirit of the invention.

A transport member 60 is comprised of a body 62 having a lift fork 64, with the lift fork 64 having a nut receiving depression-laden top 66, extending outwardly. A generally semi-cylindrical receptacle 68, having open ends, extends laterally across the lower portion of the body 62 and faces in opposite direction to the direction of the top 66 of the fork 64. The receptacle 68 is sized to supportingly receive a single nut therein. A pair of traverse pins or bolts 70 interconnect the transport member 60 to the pair of transport brackets 56. One transport member 60 is attached to each of the plurality of pairs of the transport brackets 56.

As seen, the transport members 60 disposed along the back leg 50 have the top 66 of the fork 64 facing upwardly and the receptacle 68 facing downwardly, while the transport members 60 disposed along the front leg 48 have the top 66 of the fork 64 facing downwardly and the receptacle 68 facing upwardly. Ideally, the forks 64 located on the back leg 50 will be tilted slightly upwardly.

A positioning air cylinder 72 is located to the side of the housing unit 12 mounted on the support frame 14. The positioning air cylinder 72 has a piston 74 slidably disposed within the body of the positioning air cylinder 72. A rod 76 attaches to the piston 74 and extends outwardly from the positioning air cylinder 72. When the positioning air cylinder 72 is actuated, the piston 74 is slidably thrust forward within the positioning air cylinder 72 causing the rod 76 to be thrust outwardly. A first four-way valve 78 controls operation of the positioning air cylinder 72, while a second four-way valve 80 provides brake means, of any appropriate design, for locking the rod 76 when the rod 76 is in an extended position. A positioning dye 82 is attached to the end of the rod 76. The positioning dye 82, which has a conical facial surface 84 for partially receiving the end of a nut N, protrudes into the housing unit 12 through an aperture 86 located on the right side plate 20.

A cracking unit is comprised of a switch bracket 88, having a horizontally disposed side portion 90 and a vertically disposed top portion 92. One or more horizontal rods 94, having a die stop plate 95, connect the right side of a vertically disposed switch activation plate 96 to the left side plate 18. The left side of the switch actuation plate 96 is biased against the switch bracket 88 by one or more flange springs 98. A cracking dye 100 is attached between the one or more horizontal rods 94 and is biased to the opposite side of the switch actuation plate 96 by a cracking spring 102 held by a flange nut 103. The cracking dye 100, which has a conical facial surface 104 for partially receiving the end of a nut N and a base 106, protrudes into the housing unit 12 through an aperture 108 on the left side plate 18. A cracking air cylinder 110, having an a piston 112 slidably disposed within the body of the cracking air cylinder 110 and a rod 114 attached to the piston 112 and extending outwardly, is located beyond the switch bracket 88. A third four-way valve 116 controls operation of the cracking air cylinder 110.

A first sensor switch 118 is attached to the top portion of the switch bracket 88 and is disposed between the switch actuation plate 96 and the side portion 90 of the switch bracket 88 in close proximity to the switch actuation plate 96. In a normally relaxed state, the switch actuation plate 96 must not activate the first sensor switch 118. Threadable adjustment means in the horizontal rods 94 permit lateral switch actuation plate 96 adjustment in order to push the switch actuation plate 96 toward the left side plate 18 so that the switch actuation plate 96 is not under the first sensor switch 118. This produces a space 119 between the cracking dye stop plate 95 and the back of the cracking die 100.

A second sensor switch 120 is disposed within the housing unit 12. The second sensor switch 120 is attached to a threaded adjustment rod 122 for vertical positioning of the second sensor switch 120. The first sensor switch 118 and the second sensor switch 120 may be either mechanically, electrically, or optically activated.

In operation, the hopper 24 is filled with nuts N and the drive motor 58 is activated causing the drive chain 46 to continuously orbit about the lower and upper sprockets. As the transport members 60 proceed along the back leg 50 of their orbital path, the fork 64 protrudes into and passes through the hopper 24. Upon lifting out of the hopper 24, a single nut N will be received on top 66 of the fork 64. The nut N will rest against the transport brackets 56, while the side plates prevent nut M departure from the fork 64.

A vertically disposed tongue 124 is located at the hopper/housing unit interface. The tongue 124, which is straddled by the fork 64 when the fork 64 protrudes into and passes through the hopper 24, prevents nuts N from falling out of the hopper N.

As the transport member 60 nears the upper summit 522 of the orbit path, the nut N rolls off of the fork 64 and is captured within the receptacle 68 of the transport member 60 that is immediately beyond the transport member 60 from which the nut N rolled off of. The nut N remains securely within the receptacle 68 during the transport member's downward travel along the front leg 48.

As the nut-laden receptacle 68 becomes level with the positioning dye 82, the positioning air cylinder 72 is actuated causing the rod 76 to be thrust outwardly which causes the positioning dye 82 to be thrust forwardly engaging the nut N within the conical face 84 of the positioning dye 82. The positioning air cylinder 72 is actuated when a transport member 60, above the transport member 60 bearing the engaged nut, passes the second sensor switch 120. The second sensor switch 120 is vertically aligned, if necessary, by the threaded adjustment rod 122, for synchronized actuation of the positioning air cylinder 72.

The rod 76 and attached positioning dye 82 continue traveling outwardly, sliding the nut N along the receptacle 68 into the conical face 104 of the cracking dye 100. The nut N continues lateral travel and engages and moves the cracking dye 100 which in turn engages and moves the switch actuation plate 96 toward the side portion 90 of the switch bracket 88. The first sensor switch can be adjusted laterally by the threaded portion The positioning air cylinder 72 is under-pressurized so that when the nut N is slid into the cracking dye 100, the nut N is not mashed therein.

When the switch actuation plate 96 passes the first sensor switch 118, the first sensor switch 118 is activated. Coincidentally with first sensor switch activation, the second four-way valve 80 activates the brake means thereby locking the rod 76 in place thereby securely and firmly stressing and positioning the nut N between the positioning dye 82 and the cracking dye 100. The cracking air cylinder 110 is now actuated and its rod 114 is thrust outwardly, impacting the base 106 of the cracking dye 100, which in turn impacts the nut N. The cracking air cylinder's rod 114 retracts immediately thereafter. As the positioning dye 82 is locked in place, the impact on the nut M causes the nut M to crack. Thereafter, the second four-way valve 80 is reset unlocking the positioning air cylinder's rod 72 and then the first four-way valve 78 is reset thereby retracting the positioning air cylinder's rod 76.

As the cracked nut-laden transport member 60 enters the lower summit 54 of its orbit path, the receptacle 68 gravity deposits the nut M into a collection bin 128 located thereunder.

If desired, the tip of the cracking air cylinder's rod 114 and the cracking dye's base 106 can each be rubber-tipped in order to reduce wear on these parts.

Appropriate circuitry, in electrical communication with the first sensor switch 118, the second sensor switch 120, and with the first four-way valve 78, the second four-way valve 80 and the third four-way valve 116, control proper activation of the three four-way valves.

The following illustrates the function flow of the electrical circuitry. The second sensor switch 120 is initially activated which activates a One Shot Timer 130 and an On Delay Timer 132. The One Timer 130 the f immediately activate the first four-way valve 78 causing outward thrust of the positioning air cylinder's rod 76. Thereafter, the first sensor switch 118 is activated which causes the second four-way valve to momentarily activate causing the brake to lock the positioning air cylinder's rod 76. During the momentary activation of the second four-way valve 80, the On Delay Timer 132 expires causing the third four-way valve 116 to activate in turn causing the cracking air cylinder's rod 114 to thrust forward and crack the nut N and thereafter, retract. After second four-way valve 80 ceases activation, thereby unlocking the positioning air cylinder's rod 76, the One Shot Timer 130 expires, causing the first four-way valve 78 is reset and thereby causing the positioning air cylinder's rod 76 to retract. Thereafter, the cycle is repeated in order to crack the next nut N.

Adjustment means can be provided for the circuitry, specifically the two timers 130 and 132, to either advance or retard the activation of any of the four-way valves for proper synchronization of the cracking operation.

While the invention has been particularly shown and described with reference to an embodiment thereof, it will be understood by those skilled in the art that various changes in form and detail may be made without departing from the spirit and scope of the invention.

I claim:

1. A nut cracking device comprising:

a hopper for holding a plurality of nuts;

a transport means, passing through the hopper, for retrieving nuts individually in succession from the hopper;

a cracking means for imparting a cracking force against the cracking dye;

an air cylinder, having an internal piston slidably disposed within the air cylinder, and a rod having a first end attached to the piston and a second end extending outwardly from the air cylinder;

a positioning dye, attached to the second end of the rod, for receiving an end of the nut;

wherein when the air cylinder is actuated, the piston slidably moves toward the nut such that the positioning dye positions and stresses the nut against the cracking dye; and a lock means for locking the rod in place when the nut is positioned and stressed against the cracking dye.

2. The device as in claim 1 wherein to further include:

a frame, for positioning the hopper, the pneumatic positioning means, the cracking dye, and the cracking means thereon; and a housing assembly, having a left side plate and a right side plate connected by a front plate, positioned on the frame, for receiving the transport means therein.

3. The device as in claim 2 wherein the transport means is comprised of:

a first shaft, rotatably disposed between the left side plate and the right side plate;

a first sprocket, fixedly attached to the first shaft;

a second shaft, rotatably disposed between the left side plate and the right side plate;

a second sprocket, fixedly attached to the second shaft;

a drive chain entrained about the first sprocket and the second sprocket in a closed loop;

a drive means, communicating with the first sprocket, for continuously orbiting the drive chain about the first sprocket and the second sprocket; and a plurality of transport members attached in succession to the drive chain.

4. The device as in claim 3 to further include tension adjustment means for adjusting the tension of the drive chain.

5. The device as in claim 4 wherein the transport member is comprised of:

a body;

a fork, protruding from the body and facing upwardly during the transport member's upward travel, for retrieving the nuts from the hopper; and a receptacle, sized to receive one of the nuts therein and facing upwardly during the transport member's downward travel, for gravity receiving the nut from the fork of the succeeding transport member as the succeeding transport member moves successively from upward travel to downward travel.

6. The device as in claim 5 wherein the receptacle is open-ended.

7. The device as in claim 1 wherein the positioning dye has a conical face.

8. The device as in claim 1 wherein the air cylinder is underpressurized.

9. The device as in claim 1 wherein the air cylinder is actuated by a sensor switch triggered by the transport means.

10. The device as in claim 9 to further include adjustment means for adjusting proper synchronization of the triggering of the sensor switch.

11. The device as in claim 1 to further include a collection bin for collecting the cracked nuts.

12. The device as in claim 1 wherein the cracking means is comprised of:

a bracket;

a sensor switch plate, resiliently attached to the bracket, having the cracking dye resiliently attached to the sensor switch plate; and an air cylinder, having an internal piston slidably disposed within the air cylinder, and a rod having a first end attached to the piston and a second end extending outwardly from the air cylinder, such that the rod imparts the cracking force onto the cracking dye when the air cylinder is actuated.

13. The device as in claim 12 wherein the cracking dye has a conical face.

14. The device as in claim 12 wherein the air cylinder is actuated by a sensor switch triggered by lateral movement of the sensor switch caused by the nut being positioned against and moving the cracking dye which moves the sensor switch plate.

15. The device as in claim 14 to further include adjustment means for adjusting proper synchronization of the triggering of the sensor switch.

* * * * *